Patented Feb. 9, 1932

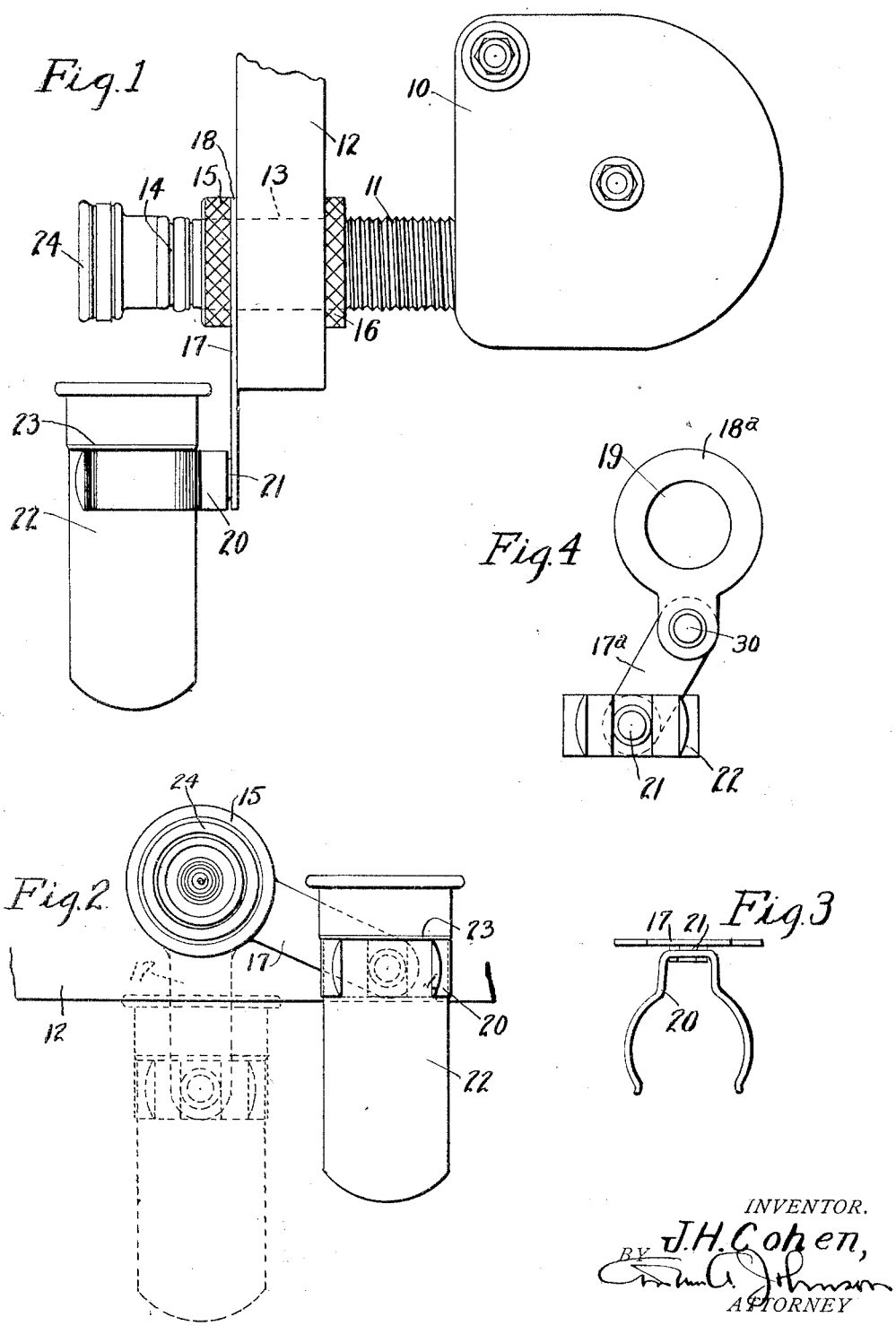

1,844,380

UNITED STATES PATENT OFFICE

JOSEPH H. COHEN, OF BRIDGEPORT, CONNECTICUT

ASH RECEPTACLE

Application filed October 26, 1926. Serial No. 144,269.

This invention relates to ash receivers for motor vehicles, and more particularly to an ash receiver for use with electric cigar-lighters.

An object of this invention is to provide an ash receiver which may be easily and quickly attached to the instrument board of a motor vehicle, and yet allow the ash receptacle proper to be easily removed for cleaning.

Another object is to provide an ash receiver which may be engaged by a part of the electric cigar-lighter, so that the ash receiver may be secured in place on the instrument board at the same time that the cigar-lighter is fastened in place, and preferably by the same means.

And yet another object of this invention is to provide an ash receiver for attachment to instrument boards of motor vehicles, which ash receivers may be shifted or adjusted to various positions with relation to the electric cigar-lighter with which it is preferably used.

Other features and advantages will hereinafter appear.

In the accompanying drawings which illustrate one form of the present invention, that at present preferred—

Figure 1 is a side elevation showing a cigar-lighter attached to an instrument board of a motor vehicle with the ash receiver of the present invention mounted thereon.

Fig. 2 is a front view of the parts shown in Fig. 1, two of the positions to which the ash receiver may be adjusted being shown, one being shown in dotted lines.

Fig. 3 is a top plan view of the bracket of the ash receiver of the present invention.

Fig. 4 is a front view of a modification of the ash receiver shown in Figs. 1 to 3.

As shown in the accompanying drawings, the electric cigar-lighter 10 is provided with a threaded sleeve 11 which, when mounted on the instrument board 12 of a motor vehicle, passes through an aperture 13 in said instrument board, so that the threaded sleeve 11 protrudes slightly beyond the instrument board. At its end, the threaded sleeve 11 is adapted to receive the igniting unit 14 of the cigar-lighter, so that the igniting unit may be withdrawn therefrom by hand for use. The cigar-lighter is held in adjusted position on the instrument board by front and rear nuts 15 and 16 which engage opposite sides of the instrument board to firmly hold the threaded sleeve 11 in position thereon.

The ash receiver of the present invention comprises a bracket plate 17, whose upper end is provided with a ring 18 having an aperture 19 adapted to be slipped over the threaded sleeve 11 of the cigar-lighter. At its lower end, the bracket 17 is provided with a spring clip 20 pivotally connected to the bracket plate 17 by a stud 21. The spring clip 20 is shaped to encircle an ash receptacle 22 so as to hold the ash receptacle in proper position on the bracket with a flared upper portion 23 of the ash receptacle 22 engaging the top of the spring clip. If desired, the clip 20 may be made of non-resilient material, in which case the ash receptacle would be moved out of the clip vertically when it is desired to empty the same. However, it is preferable that the clip 20 be made of springy material and be open at the front, so that the ash receptacle 22 may be withdrawn horizontally from the clip and quickly and easily snap back into place after it has been cleaned.

To mount the ash receiver above described on the instrument board, the ring 18 of the bracket plate 20 is slipped over the threaded nozzle 11 after the threaded nozzle has been inserted in a prepared aperture in the instrument board. Then the nut 15 is screwed on the threaded nozzle until it firmly presses the ring 18 which also thus acts as a washer against the instrument board and draws the nut 16 firmly in place. Of course, the nut 15 may be set in place and the tightening may be performed by the nut 16, if desired, with the same effect. Hence, it will be seen that the ash receiver may be mounted on the instrument board at the same time the cigar-lighter is being secured in place thereon and by the same means. In cases where the ash receiver is to be placed on a cigar-lighter which was already mounted on the instrument board, it is merely necessary to remove the nut 15 and slip the ring 18 over the threaded sleeve 11.

Attention is called to the fact that, as is customary with cigar-lighters for motor vehicles, the ash guard 24 is made removable so as to permit the sleeve 11 to be placed through the aperture in the instrument board and so as to permit the nut 15 to be slid over the end of the igniting unit. This same operation is performed when it is desired to attach the ash receptacle of the present invention, and hence it should be understood that in the above description of the method of applying the ash receiver of the present invention, it is understood that the ash guard 24 has been removed from the igniting unit 14.

In some cases, the cigar-lighter is not mounted directly on the instrument board but on a bracket secured to the instrument board. Such a bracket has an aperture corresponding to the hole in the instrument board through which the threaded sleeve 11 passes. In such cases, the ring 18 of the bracket plate 17 is slipped over the threaded sleeve 11 in exactly the same way as it is when the cigar-lighter is mounted in the instrument board itself.

The cigar-lighter 10 may, of course, have any position on the instrument board that the user desires, and it has been found extremely inconvenient to have the ash receiver so constructed that it cannot be adjusted angularly with relation to the cigar-lighter, for in some of the positions in which the cigar-lighter may be put the ash receiver would be in the way.

Accordingly, the present invention provides the ash receiver so that it may be adjusted to any position found convenient by the user. Hence, the aperture 19 of the ring 18 is made to loosely fit the threaded sleeve 11 so that the bracket may be adjusted angularly with relation to the cigar-lighter and the perpendicular. For instance, it may be adjusted to the position shown in full lines in Fig. 2, where the mouth of the ash receiver 22 will be at the side of the igniting unit, or the bracket 17 may be swung around the sleeve 11 so as to bring the ash receiver to the position shown in dotted lines in Fig. 2, where it is located directly beneath the igniting unit. It will be noted that it is merely necessary to loosen the nut 15 and adjust the bracket plate 17 to proper position and then tighten the nut 15 to hold the bracket plate in the desired angular position.

In order to permit this adjustment to be made and yet to allow the ash receptacle 22 to be kept in perpendicular position, the pivotal connection constituted by the stud 21 is provided between the clip 20 and the bracket plate 17. Hence, when the bracket plate 17 is adjusted—say, to the position shown in Fig. 2,—the clip 20 may be rotated sufficiently to bring the ash receptacle 22 to a perpendicular position. Here again, however, the adjusted position of the ash receiver may be anything that the user desires, and it is possible by provision of a swivel connection constituted by the stud 21 to have the ash receptacle located at an angle with relation to the perpendicular if this is found more convenient by the user.

A modification of the ash receiver shown in Figs. 1 to 3 is shown in Fig. 4. In this form, it is not necessary to loosen the nut 15 when adjusting the bracket plate, for the bracket plate is made in two parts, one the ring 18a and the other a plate 17a with a pivotal connection 30 between them. This pivotal connection permits the plate 17a to be swung to any desired angular position without disturbing the ring 18a. The lower end of the plate 17a has a clip 20 pivotally connected thereto by the stud 21 just as in the other form.

Variations and modifications may be made within the scope of this invention and portions of the improvements may be used without others.

Having described the invention, what is claimed as new and for which it is desired to obtain Letters Patent, is:—

1. Supporting means for an ash receiver for an electric cigar-lighter having a sleeve by means of which the cigar-lighter is supported, comprising a bracket plate having an aperture adapted to fit and through which said sleeve is adapted to pass when the bracket plate is slid over the sleeve and supported thereon; and a socket on the bracket plate to support an ash receptacle.

2. Supporting means for an ash receiver for an electric cigar-lighter having a sleeve by means of which the cigar-lighter is supported, comprising a bracket plate adapted to be supported on said sleeve and having a ring adapted to bear upon and loosely fit said sleeve whereby the bracket plate may be adjusted angularly around said sleeve and with relation to the perpendicular; means for holding said bracket plate in adjusted position; and a socket on the bracket plate to support an ash receptacle.

3. Supporting means for an ash receiver for an electric cigar-lighter having a sleeve by means of which the cigar-lighter is supported, comprising a bracket plate adapted to be supported on said sleeve and having a ring adapted to bear upon and loosely fit said sleeve whereby the bracket plate may be adjusted angularly around said sleeve and with relation to the perpendicular; means for holding said bracket plate in adjusted position; a socket on the bracket plate to support an ash receptacle; and means for mounting said socket rotatably on said bracket plate to permit the socket to be shifted to maintain the ash receptacle supported thereby perpendicular or in other desired position when the bracket plate is adjusted angularly with relation to the perpendicular.

4. In a device of the character described, a flat plate having a ring at one end and an arm coextensive with the ring, said ring being adapted to be slipped over a tubular support; a flat arm pivoted to the arm on said plate; and a socket member mounted on said second-named arm and adapted to support a receptacle.

5. In a device of the character described, a flat plate having a ring at one end and an arm coextensive with the ring, said ring being adapted to be slipped over a tubular support; a flat arm pivoted to the arm on said plate; and a socket member rotatably mounted on said second-named arm and adapted to support a receptacle.

Signed at Bridgeport, in the county of Fairfield, and State of Connecticut, this 25th day of October, 1926.

JOSEPH H. COHEN.